(No Model.) 4 Sheets—Sheet 1.

J. RUNSER.
SAUSAGE OR MEAT CUTTING MACHINE.

No. 600,128. Patented Mar. 1, 1898.

Witnesses:
H. B. Hallock
S. Williamson

Inventor:
John Runser
by Geo. H. Holgate
Attorney.

(No Model.) 4 Sheets—Sheet 2.
J. RUNSER.
SAUSAGE OR MEAT CUTTING MACHINE.
No. 600,128. Patented Mar. 1, 1898.
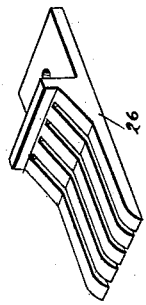
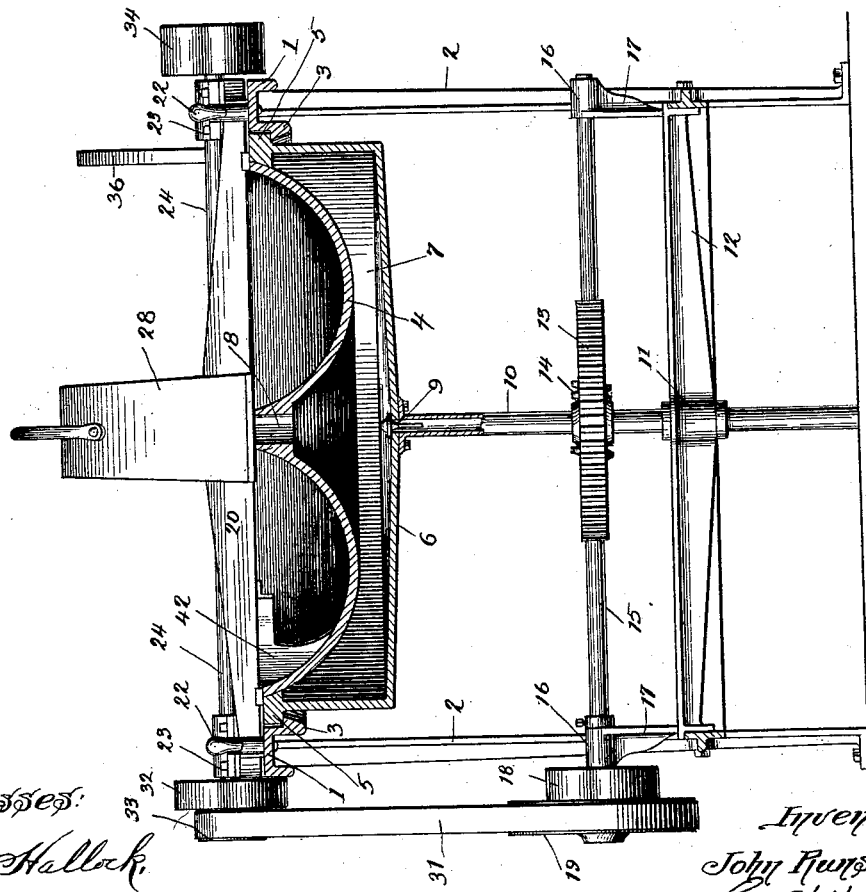
Witnesses:
H. B. Hallock.
S. Williamson.
Inventor:
John Runser,
by Geo. H. Holgate
Attorney (No Model.) 4 Sheets—Sheet 3.
J. RUNSER.
SAUSAGE OR MEAT CUTTING MACHINE.
No. 600,128. Patented Mar. 1, 1898.
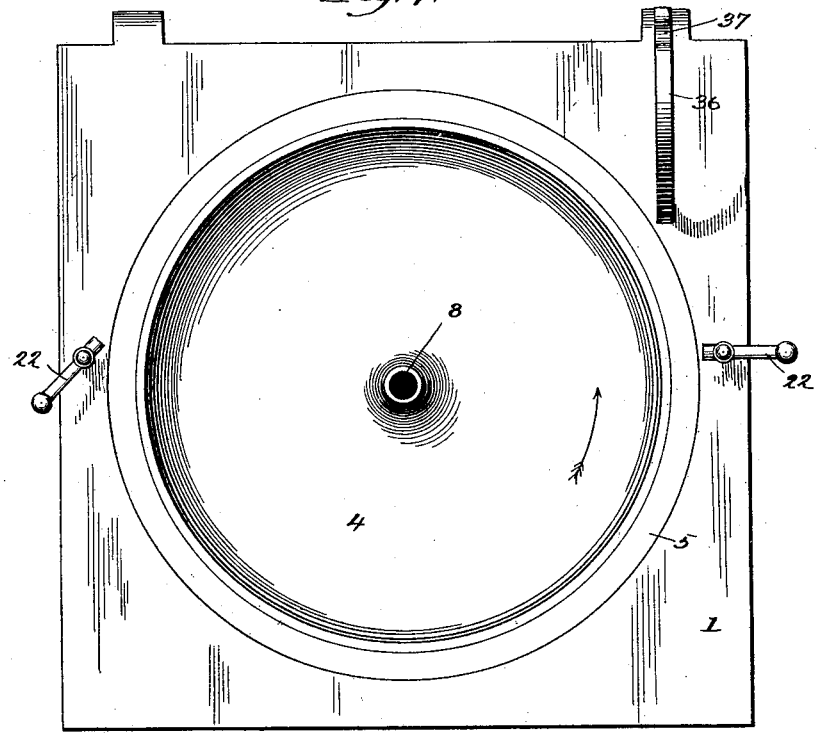
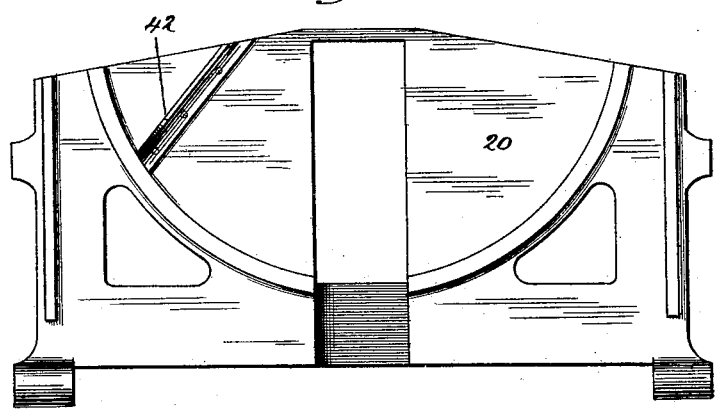
Witnesses:
H. B. Hallock
J. J. Williamson
Inventor:
John Runser.
by Geo. H. Holgate
Attorney.

(No Model.) 4 Sheets—Sheet 4.

J. RUNSER.
SAUSAGE OR MEAT CUTTING MACHINE.

No. 600,128. Patented Mar. 1, 1898.

WITNESSES:
H. B. Hallock.
S. S. Williamson

INVENTOR
John Runser
BY Geo. H. Holgate
ATTORNEY.

UNITED STATES PATENT OFFICE.

JOHN RUNSER, OF VAN WERT, OHIO, ASSIGNOR, BY DIRECT AND MESNE ASSIGNMENTS, TO WILLIAM S. BEALE AND LILLIE G. BEALE, OF SAME PLACE.

SAUSAGE OR MEAT CUTTING MACHINE.

SPECIFICATION forming part of Letters Patent No. 600,128, dated March 1, 1898.

Application filed September 19, 1896. Serial No. 606,360. (No model.)

*To all whom it may concern:*

Be it known that I, JOHN RUNSER, a citizen of the United States, residing at Van Wert, in the county of Van Wert and State of Ohio, have invented a certain new and useful Improvement in Sausage or Meat Cutting Machines, of which the following is a specification.

This invention relates to a new and useful improvement in sausage and meat cutting machines, and has for its object to simplify the construction of such machines and to greatly increase their capacity and the facility with which they may be operated, and also to so organize such a machine as to produce a better quality of sausage or chopped meat, in that the grain thereof will not be deteriorated or the meat become soft during the action thereon by the machine.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1:
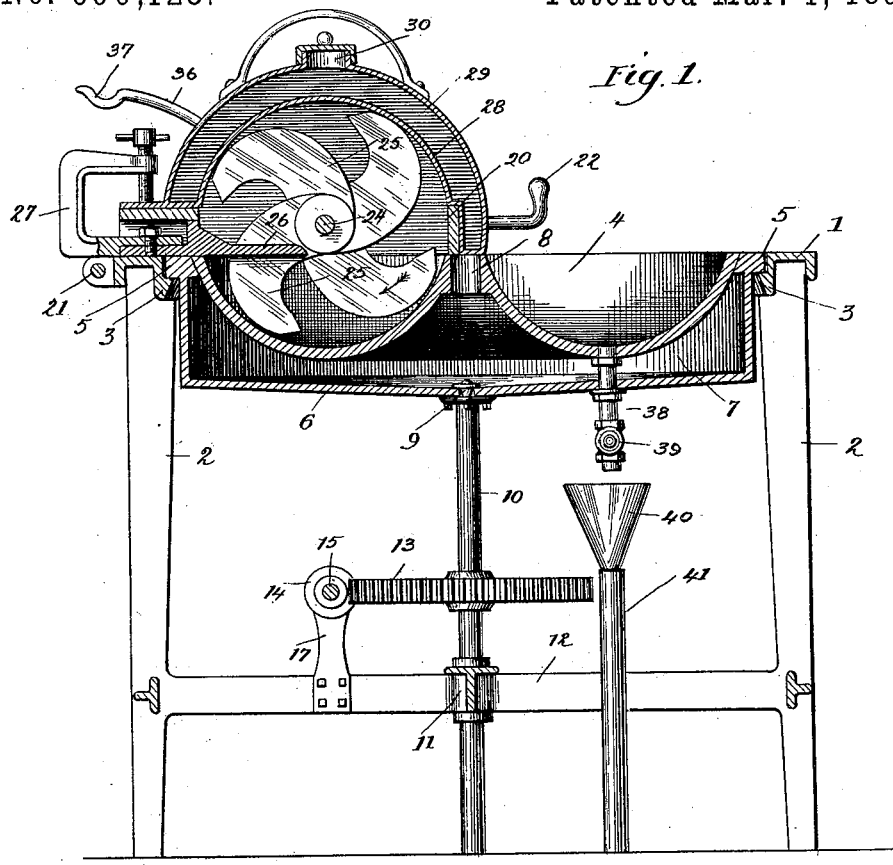
Figure 2:
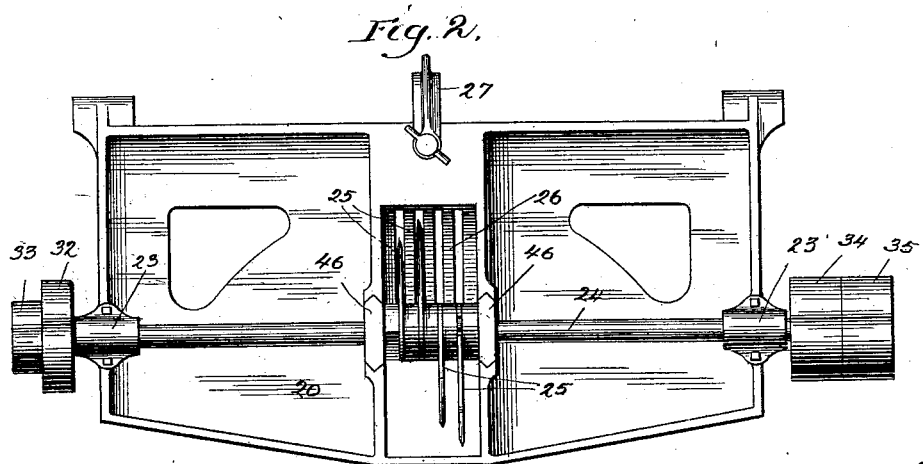

Figure 1 is a central vertical section of a machine built in accordance with my improvement; Fig. 2, a plan view of the swinging top having the cover removed therefrom to illustrate the relative position of the knives; Fig. 3, a section taken at right angles to Fig. 1; Fig. 4, a plan view of the frame and bowl, the top containing the knives being removed therefrom; Fig. 5, a bottom plan of the top, the knives being removed therefrom; Fig. 6, a detail perspective of the comb through which the knives operate; Fig. 7, a detached view of one of the knife-blades; and Fig. 8, a section similar to Fig. 1, illustrating the arrangement of my improved machine when not designed for the application of ice or cooling tanks.

In carrying out this invention as embodied in Figs. 1 to 7, inclusive, I provide a frame 1, which is here shown as square in plan view, and this frame is supported by suitable legs 2, which may be of any design that fancy or utility may dictate, and the frame has a circular opening of suitable diameter relative to the size of said frame, and around the edge of this opening is formed an annular flange 3. A bowl 4, of circular shape, having a projecting ledge 5, is supported by the flange 3 in such manner as to bring the upper surface of the bowl flush with the upper surface of the frame. The bowl is raised in the center, so as to form a circular trough, which in cross-section forms a part of a true circle, as clearly shown in Figs. 1 and 3, for the purpose hereinafter set forth. Secured to the under side of the bowl is a jacket 6, by which means a compartment or chamber 7 is formed beneath and around the bowl for the purpose of holding a cooling agent, such as ice, to reduce the temperature of the meat operated upon within the bowl. This chamber may be filled through the opening 8 at the center of the bowl and water may be withdrawn therefrom through the valve 9. A shaft 10 is bolted to the under side of the jacket and has a passage therethrough which communicates with the chamber 7 by way of the valve, and this shaft is journaled at 11 in the cross-frame 12, so that when the shaft is revolved the bowl will also be revolved, which constitutes the feed of the machine, as will be hereinafter set forth, and this revolving of the shaft is brought about by the worm-wheel 13, secured thereon, with which meshes the worm 14, the latter being mounted upon a shaft 15, said shaft having its bearings at 16 within the posts 17, carried by the cross-frame; and in order that the worm-shaft 15 may receive motion the pulleys 18 and 19 are mounted upon one end thereof, said pulleys being of different diameter, as clearly shown, and the object of this difference in the diameters of the pulleys is to provide for a double feed for the cutting of the meat fine or coarse.

The top 20 is hinged at 21 to the frame, so that when in normal position it rests upon the upper surface of the frame and is held in place by the locking-cranks 22, adapted to be swung over the edge of the top and secure the same in place. In this top is journaled at 23 a shaft 24, upon which is mounted the knives 25, the latter being of the peculiar shape shown in Figs. 1 and 7, and arranged to conform to the contour of the cross-section of the trough and pass in close proximity to the bottom thereof when revolving therein, and, as here shown, these knives are set ninety degrees apart upon the shaft, which will cause them to successively act upon the meat within the trough when the latter is fed in the proper direction. As seen, the knives occupy a space formed by the cut-away portion of the top, which also forms a cut-away for the comb 26, which latter is held in place by the clamp 27, and when so held the teeth thereof embrace the knives, so that when said knives are caused to revolve they pass through the interdental spaces in the comb, and since these knives revolve in the direction of the arrow marked thereon it is obvious that after they have acted upon the meat within the trough they will be free from the same, so as not to lift it upward when passing out of the trough, since the teeth of the comb will act as scrapers for the knives. A further use for the comb is to strengthen the knives and prevent them from being swung out of line when in operation.

A cover 28 is arranged to inclose the knives from above in order that surrounding objects may not come in contact therewith and also to prevent the scattering of small particles of meat which may adhere thereto, and this cover is secured in place by the clamp 27, which also holds the comb in place, as before stated. In the construction here under consideration this cover is so formed as to provide a compartment or chamber 29 for holding the cooling agent, and access is gained to this chamber for the introduction of said agent by the opening 30, which may be closed in any suitable manner.

Power is provided from the shaft 24 to the shaft 15 by a belt 31, running from one or the other of the pulleys 18 and 19 and over one of the corresponding pulleys 32 and 33, and the shaft 24 receives its motion from any suitable source of power through the pulley 34, which is secured thereon, and the fast pulley 35 is arranged in juxtaposition to the last-named pulley to facilitate the stopping and starting of the machine. From this it will be seen that when the shaft 24 is revolved, carrying therewith the knives 25, the shaft 15 will also revolve and in turn, as before described, bring about the rotating of the bowl in the direction of the arrow marked thereon in Fig. 4. This will gradually bring the meat contained within the trough into the field of action of the knives, and the degree of fineness to which said meat is chopped will be determined by the relative speed of the knives to the rotations of the bowl, this being determined by the position of the belt 31 upon the pulleys 18 and 19 and 32 and 33, it being obvious that when said belt is upon the pulleys 19 and 33 the speed of the bowl relative to the speed of the knives will be less than when said belt is upon the pulley 18 and 32, and, if found desirable, other pulleys may be added, which still further vary in size, thus accomplishing a further variation in the degree of fineness to which the meat may be chopped.

The top covers about one-half of the bowl when in position, and it is therefore not necessary to raise the same, except when the bowl is to be cleaned, since the meat to be operated upon is inserted within the bowl at that portion which is not under the top while the machine is running, thereby saving considerable time, from the fact that it is not necessary to stop the machine for this purpose.

To facilitate the cleansing of the bowl by washing, &c., a segmental spring 36 is secured to the upper surface of the frame and passes through an opening in the top, so that when said top is swung upward upon its pivot-points 21 it will be retained in its elevated position by the depression 37, formed upon the end of the spring, entering into engagement with the opening through which the spring passes, thereby acting as a latch, and when it is desired to lower the top the same is accomplished by disengaging this depression by forcing the spring downward, as will be readily understood. When the bowl is being cleansed by the use of water, said water may be withdrawn therefrom through the pipe 38, the latter having a valve 39 located therein for the control of the outflow of this water, and this pipe is so located that it may be brought over the funnel 40, supported by the pipe 41, which leads to any convenient outlet.

As is well understood in this art, cold water may be applied to the meat during the process for the purpose of preserving the grain of said meat while being acted upon by the knives, and said water will be absorbed by the meat when the amount supplied thereto is in the right proportion.

From this description it is obvious that the capacity of a machine built in accordance with my improvement will be considerable, and that the speed thereof may be so varied as to produce the quality of chopped meat or suasage desired, and that little or no handling is required to produce these results, and also that but little attention is needed upon the part of the operator in producing the desired results.

By the use of the cooling agent in both the construction 7 and 29 the temperature of the meat is kept at a low degree, thus improving both its quality when finished as well as facilitating the operations of the machine, since the meat is thereby prevented from becoming soft and sticky.

A deflector 42 is secured upon the under side of the top and at such an angle as to cause the meat within the trough to be forced out of the way of the cover by the revolving of the bowl and acts as a packer for the meat, as will be readily understood.

While any desired style of knife might be used, I have found by experiment that the design here shown is most advantageous, since its length is not affected by the sharpening thereof, and it acts after the manner of a draw cut, so that the meat is not broken when subjected to the knives, but is shaved with a smooth cut, greatly enhancing the value and appearance of the finished product.

I do not wish to be limited to any particular or exact design of framework, as this may be arranged to best suit the requirements under which the machine is to operate and may be varied in various machines.

Figure 8:
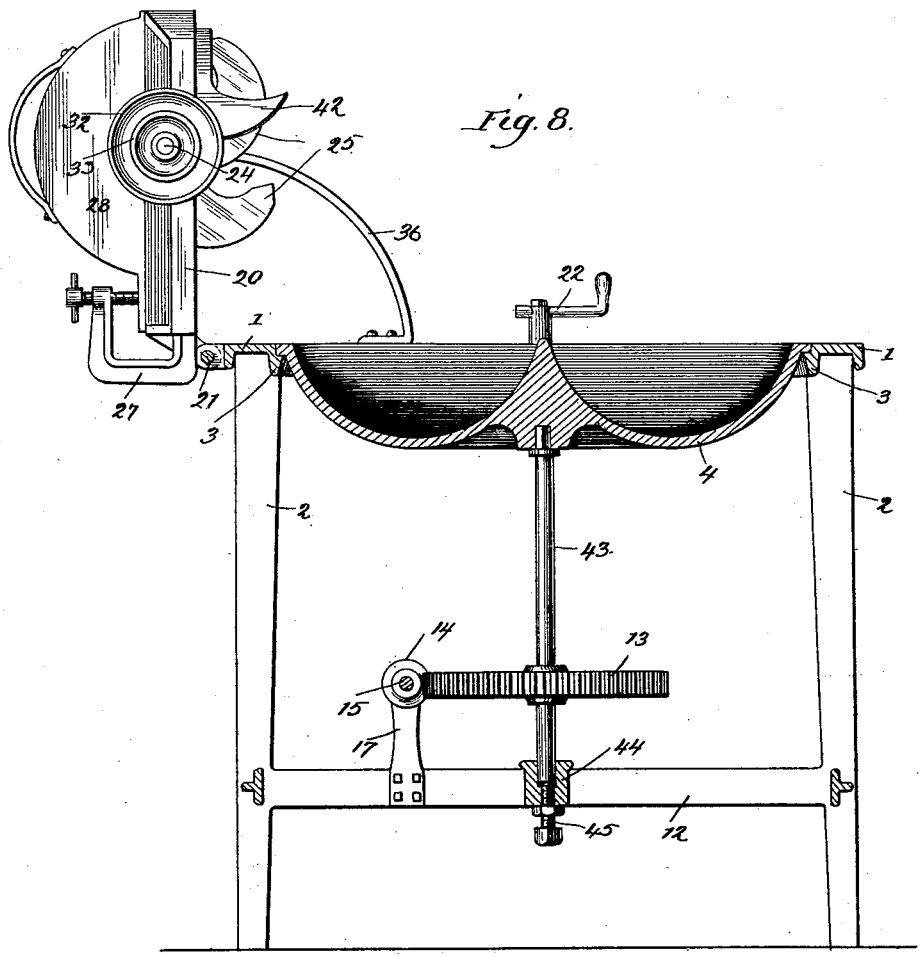

In the modification shown in Fig. 8 the compartments for containing the cooling agent are dispensed with, and this machine is well adapted for some purposes, and the shaft 43 in this construction is secured directly to the bottom of the bowl and is fitted in the bearing 44, which latter is provided with a set-bolt 45, by means of which said shaft may be adjusted vertically, the remainder of this machine being substantially the same as that just described.

To prevent the escape of small particles of meat and grease around the shaft 24, I provide Babbitt packings 46, which are arranged to be held in V-shaped ways, as clearly shown in Fig. 2, so that when the shaft is passed therethrough they will be prevented from displacement by fitting snugly against the hub of the knives to form a closed joint through which no particles of meat or grease may pass, and this is of considerable importance, since it prevents the clogging of the machine and renders it more cleanly.

Having thus fully described my invention, what I claim as new and useful is—

In a meat or sausage cutting machine of the character described the combination of the hinged cover therefor, and the backwardly-curved segmental spring-rod rigidly secured to said machine and passing through an opening in said cover and having its outer free-end portion provided with an open notch or crook on its upper side adapted to snap into engagement with said opening, when said cover has been elevated as described.

In testimony whereof I have hereunto affixed my signature in the presence of two subscribing witnesses.

JOHN RUNSER.

Witnesses:
S. S. WILLIAMSON,
ENOCH CONNER.